US006832196B2

(12) United States Patent
Reich

(10) Patent No.: US 6,832,196 B2
(45) Date of Patent: Dec. 14, 2004

(54) SPEECH DRIVEN DATA SELECTION IN A VOICE-ENABLED PROGRAM

(75) Inventor: David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 09/822,657

(22) Filed: Mar. 30, 2001

(65) Prior Publication Data

US 2002/0173964 A1 Nov. 21, 2002

(51) Int. Cl.[7] .......................... G10L 21/06; G10L 15/22; G10L 13/04
(52) U.S. Cl. .................... 704/270.1; 704/275; 704/251; 704/260
(58) Field of Search ............................. 704/270.1, 270, 704/275, 251, 260

(56) References Cited

U.S. PATENT DOCUMENTS

| 5,758,322 | A | * | 5/1998 | Rongley ..................... 704/275 |
| 5,926,789 | A | * | 7/1999 | Barbara et al. .......... 704/270.1 |
| 6,185,535 | B1 | * | 2/2001 | Hedin et al. ................ 704/275 |
| 6,269,336 | B1 | * | 7/2001 | Ladd et al. .................. 704/270 |
| 6,490,564 | B1 | * | 12/2002 | Dodrill et al. .............. 704/275 |
| 6,532,446 | B1 | * | 3/2003 | King ........................... 704/275 |
| 6,604,075 | B1 | * | 8/2003 | Brown et al. ............ 704/270.1 |
| 6,606,596 | B1 | * | 8/2003 | Zirngibl et al. ............. 704/270 |
| 2001/0032076 | A1 | * | 10/2001 | Kursh ......................... 704/257 |

OTHER PUBLICATIONS

"Voice eXtensible Markup Language (VoiceXMLtm) Version 1.0", W3C Note, May 5, 2000.

* cited by examiner

*Primary Examiner*—Richemond Dorvil
*Assistant Examiner*—Daniel Nolan
(74) *Attorney, Agent, or Firm*—Akerman Senterfitt

(57) ABSTRACT

A method of dynamically formatting a speech menu construct can include a series of steps. A markup language document containing a reference to a server-side program can be provided. The server-side program can be programmed to dynamically format data using a voice-enabled markup language. A database can be accessed using the server-side program. The database can have a plurality of data items. Using the voice-enabled markup language, the selected data items can be formatted thereby creating speech menu items. The speech menu items can specify a speech menu construct resulting in a menu interface that is dynamically generated from data in data store, rather than being written by a programmer, and allows the user to "speak to the data."

8 Claims, 3 Drawing Sheets

SPEECH DRIVEN DATA SELECTION IN A VOICE-ENABLED PROGRAM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition, and more particularly, to a method of dynamically providing a user speech access to the data in a voice-enabled program.

2. Description of the Related Art

Speech recognition systems enable computers to understand and extract information from human spoken language. Such systems can function in a complimentary manner with a variety of other computer programs where there exists a need to understand human language. Speech recognition systems can extract relevant information contained within human speech and then supply this information to another computer program or system for purposes such as booking flight reservations, finding documents, or summarizing text.

Currently within the art, many speech recognition systems are implemented as directed dialog systems. Directed dialog speech recognition systems typically prompt or instruct a user as to the proper form of an immediate user response. For example, a directed dialog system can instruct a user as follows "Say 1 for choice A, Say 2 for choice B". By instructing the user as to the proper format for an immediate user response, the speech recognition system can expect a particular type of speech response. Accordingly, the speech recognition system can process that user response more accurately and function more efficiently.

Directed dialog speech recognition systems commonly serve as interfaces for larger distributed voice applications. VoiceXML is a markup language for distributed voice applications based on extended markup language ("XML"), much as HTML is a markup language for distributed visual applications. VoiceXML is designed for creating audio dialogs that feature synthesized speech, digitized audio, recognition of spoken and Dual Tone Multifrequency ("DTMF") key input, recording of spoken input, telephony, and mixed-initiative conversations. Version 1.0 of the VoiceXML specification has been published by the VoiceXML Forum in the document by Linda Boyer, Peter Danielsen, Jim Ferrans, Gerald Karam, David Ladd, Bruce Lucas and Kenneth Rehor, Voice extensible Markup Language (VoiceXML ™) version 1.0, (W3C May 2000), which is incorporated herein by reference. Additionally, Version 1.0 of the VoiceXML specification has been accepted by the World Wide Web Consortium as an industry standard.

Version 1.0 of the VoiceXML specification provides a high-level programming interface to speech and telephony resources for program developers, service providers and equipment manufacturers. As noted in the W3C submission, standardization of VoiceXML will simplify creation and delivery of Web-based, personalized interactive voice-response services; enable phone and voice access to integrated call center databases, information and services on Web sites, and company intranets; and help enable new voice-capable devices and appliances.

As defined in the VoiceXML specification, the "menu" tag provides developers with a standard mechanism for creating speech based menus. Developers can specify a static list of speech menu items which can be presented to a user. The "choice" tag within the "menu" construct allows the developer to specify a phrase that, when spoken by the user, will indicate to the VoiceXML program that a particular menu item has been selected.

Despite the advantages of using the menu facility of VoiceXML, the constructs can lead to an inflexible programming model which forces users to follow a rigid predetermined menu structure. Specifically, during the design phase of a voice-enabled system, developers must determine the overall speech menu structure for navigating that system. Moreover, the developer must determine the individual speech menu items to be included within each speech menu and speech submenu. Finally, once speech menu structures and corresponding speech menu items are determined, the developer must perform the cumbersome task of building the speech menus.

SUMMARY OF THE INVENTION

The invention disclosed herein concerns a method for dynamically generating speech menus in a voice-enabled program such that the user can select menu items by speaking the contents of the data. In particular, the invention can use VoiceXML in combination with one or more embedded server-side programs to dynamically generate speech menus within a voice-enabled program such as a voice-enabled Web application. A server-side program, which can be accessed via a computer communications network, can dynamically generate markup language, for example VoiceXML, which can specify speech-enabled menu items in a speech menu. More particularly, the server-side program can access a database having one or more speech menu items stored therein. According to predetermined logic, the server-side program can select one or more data items from the database. Selected data items can be formatted using a voice-enabled markup language in order to specify the speech menu. In this manner, speech menu items can be selected dynamically from a database rather than being statically hard coded into the markup itself. The server-side program can be implemented using any network-centric server-side programming technology, for example, Perl, Active Server Pages, java Server Pages, and the like.

One aspect of the present invention can include a method of dynamically formatting a speech menu construct. The method can include providing a markup language document containing a reference to a server-side program. The server-side program can be programmed to dynamically format data using voice-enabled markup language such as VoiceXML. The method further can include accessing a database using the server-side program where the database can have a plurality of data items. Particular ones of the plurality of data items can be selected and formatted using the voice-enabled markup language thereby creating formatted speech menu items specifying a speech menu construct. Additionally, the method can include generating a speech grammar using the identified particular ones of the plurality of data items, wherein the speech grammar can be used to voice-process menu choices corresponding to the speech menu items in the speech menu construct.

Another aspect of the invention can include a system for generating a speech menu construct. The system can include a voice-enabled markup language document and a server-side program accessible by a reference to the server-side program contained within the voice-enabled markup language document. The server-side program can be programmed to access a database of data items and format selected data items for inclusion within the speech menu construct using a voice-enabled markup language.

Another aspect of the invention can include a machine readable storage, which can be a VoiceXML formatted machine readable storage, having stored thereon a computer program having a plurality of code sections executable by a machine for causing the machine to perform a series of steps. The steps can include providing a markup language document, which can be a VoiceXML document, containing a reference to a server-side program. The server-side program can be programmed to dynamically format data using voice-enabled markup language such as VoiceXML. The method further can include accessing a database using the server-side program where the database can have a plurality of data items. Particular ones of the plurality of data items can be selected and formatted using the voice-enabled markup language thereby creating formatted speech menu items specifying a speech menu construct. Additionally, the method can include generating a speech grammar using the identified particular ones of the plurality of data items, wherein the speech grammar can be used to voice-process menu choices corresponding to the speech menu items in the speech menu construct.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method for dynamically generating speech menus in a voice-enabled program such as a voice-enabled Web application. In particular, the invention can use a voice-enabled markup language, such as VoiceXML, in combination with one or more embedded server-side programs to dynamically generate speech menus within a voice-enabled program. A server-side program, which can be accessed via a computer communications network, can dynamically construct and format a menu hierarchy using voice-enabled markup language such as VoiceXML. Specifically, the server-side program can access a database having one or more data items stored therein. The server-side program can select one or more data items from the database and can format the selected speech menu items using the voice-enabled markup language. In particular, the selected data items can be formatted, thereby creating speech menu items to be included as part of a voice enabled menu construct.

Figure 1:
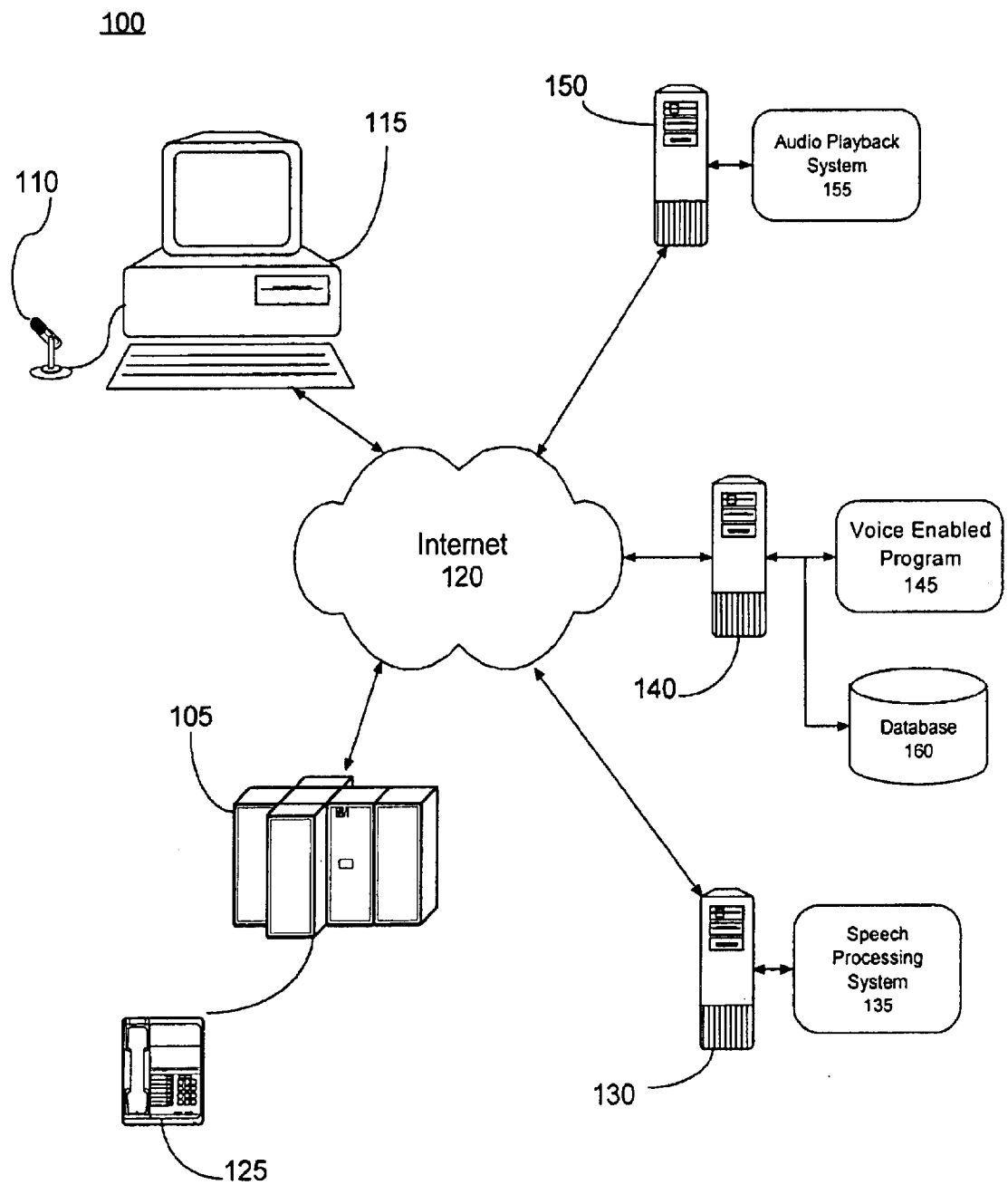
FIG. 1 depicts a typical communications network which can be used in conjunction with the present invention.

FIG. 1 depicts a typical communications network 100 which can be used in conjunction with the present invention. The system can include a transducive element such as a microphone 110 operatively connected to a computer system 115. Speakers (not shown) also can be included as part of a headset microphone or as part of the computer system 115. Alternatively, a telephone handset 125 can serve as a transducive element. The telephone handset 125 can be operatively connected to a telephone switching system 105.

The computer system 115 and the telephone switching system 105 can be communicatively connected to each other and additional computer systems such as Web servers 130, 140, and 150 via the Internet 120. Web server 150 can include an audio playback system 155. Web server 130 can include a speech processing system 135, which further can include a natural language understanding (NLU) component; and Web server 140 can include a voice-enabled program 145 and database 160. Notably, the voice-enabled program 145 can be embodied in a Website or other program such as a back end system which can be accessed via the World Wide Web using a voice-enabled interface, such as an interface capable of processing VoiceXML formatted documents. The database 160 can be an application specific database tailored to the operation of the voice-enabled program 145.

In operation, the speech processing system 135 can receive digitized speech signals and convert those signal to a set of text equivalents. The NLU component of the speech processing system 135 can extract meaning from the set of text equivalents. The voice-enabled program 145 can be any computer program which is to be voice-enabled. The audio playback system 155 can be a conventional text-to-speech system or alternatively can be configured to playback prerecorded portions of audio responsive to requests from the voice-enabled program 145 or speech processing system 135.

The aforementioned components can be realized in a centralized fashion within a single computer system. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

Computer program or program in the present context means any expression, in any language, code or notation, of a set of instructions intended to cause a system having an information processing capability to perform a particular function either directly or after either or both of the following a) conversion to another language, code, or notation; b) reproduction in a different material form.

Returning now to FIG. 1, users can interact with a voice-enabled program such as a voice-enabled Web application or a telephony based voice response system. Using the system illustrated in FIG. 1, users can speak into the microphone 110 or the telephone handset 125. In particular, user spoken utterances can be converted to digital audio data via the computer system 115 or the telephone switching system 105 respectively. The digital audio data can be transferred via the Internet using HTTP and TCP/IP to the speech processing system 135 with reference to the speech processing system's URL in order to perform speech recognition functions. As in conventional speech recognition systems, the audio signals can be processed by the speech processing system 135 to identify words spoken by a user into microphone 110.

The recognized words can be provided to the voice-enabled program 145 for further processing. The voice-enabled program 145 further can communicate with audio playback system 155 to request any of a variety of audio prompts to be played back to the user. Notably, the voice-enabled program 145 can communicate with a Web server program to dynamically access the database 160 to identify data items to be included within a speech menu. The voice-enabled program 145 can dynamically generate voice-enabled markup language, such as VoiceXML, specifying a speech menu which can include the identified data items from the database 160.

Figure 2:
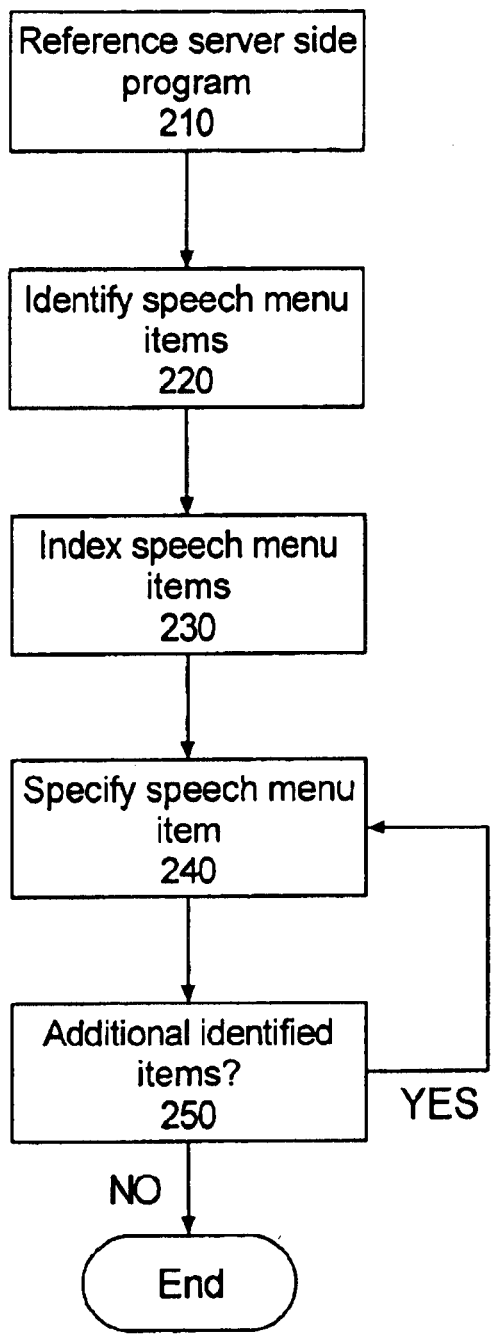
FIG. 2 is a flow chart illustrating an exemplary method of dynamically generating speech menus in a voice-enabled program.

FIG. 2 is a flow chart 200 illustrating an exemplary method for dynamically generating a speech menu using a server-side program. The server-side program described herein can be implemented using network-centric programming technology, for example, Perl, Active Server Pages, Java Server Pages and the like. The method of the invention can begin in step 210 where a server-side program can be called from a voice formatted document, such as a VoiceXML document. The program can access a database containing one or more data items. For instance, the database can be a relational database having a listing of data items categorized by several different criteria as well as including other information such as sales information and other status information. Notably the database can be part of another back-end database system such as an inventory management system. For example, in the case of a large retail book seller, the database can include the names of books presently in stock, and other book related information including, but not limited to, the author, the publisher, sales figures, the book's classification such as fiction, historical, etc., and other status parameters such as whether the book is listed on a best seller's list. The database can include any information which is deemed relevant to the particular application for which the database is used.

In step 220, the server-side program can identify one or more data items in the database, each of which can be consistent with the particular criteria used by the server-side program for selecting data items in the database. Taking the previous example, the voice-enabled program can include a speech menu presenting books from the database which are listed on a best seller's list, the "N" best selling books at that particular store location, or books from a particular author. The server-side program can be programmed accordingly to select items consistent with a particular user selected criteria. After selecting one or more data items from the database to be included within the speech menu, the method can continue to step 230.

In step 230, the server-side program can index the selected data items. The indexing can be used to determine the number of iterations which must be performed to completely specify the speech menu. Additionally, the indexing can determine the order in which the selected data items, to be formatted into resulting speech menu items, can be presented within the speech menu. After completion of step 230, the method can continue to step 240.

In step 240, a speech menu item can be formally specified by appropriately formatting the data item using the voice-enabled markup language. In particular, the server-side program can dynamically specify a URL corresponding to the data item. The server-side program further can determine the text corresponding to the first data item to be presented to the user as a speech menu item. Notably, this text can be text contained within the database. For example, if the server-side program identifies each book from the database which is listed on the best seller's list, the server-side program can determine a URL corresponding to each book. The URL can be a static parameter contained within the database or can be determined dynamically by the server-side program. The server-side program also can dynamically insert the title of the book within the menu construct as the text to be presented to the user and the text to be spoken by the user for selecting that particular item. Notably, any information within the database can be presented as a speech menu item. For example, if the database includes names of authors and publishers corresponding to each book title, that information can be presented with the book title itself as a speech menu item. After completion of step 240, the method can continue to step 250.

It should be appreciated that voice-enabled markup languages, such as VoiceXML, can take the text of formatted speech menu items and dynamically construct a grammar from that text. Accordingly, a speech grammar can be specified one menu item at a time using the "menu" and "choice" constructs. Upon entry of a menu, the menu's grammars can be built and enabled. Thus, the server side program can format data items selected from the database using appropriate voice-enabled markup language to dynamically format a speech menu construct.

In step 250, if additional identified database items exist, the method can loop back to step 240 and repeat until the markup language specifying the speech menu has been generated. If no other identified database items exist, the method can end. After completion of the method, VoiceXML has been dynamically generated which can specify a speech menu. It should be appreciated that the various steps of the method need not be performed in a specific order. For example, rather than first identifying each data item and subsequently generating VoiceXML for each item, data items can be identified singly where VoiceXML for that item can be generated prior to identifying a next data item. Additionally, one or more server-side programs can be used in accordance with the invention. For example, individual server-side programs can be utilized for each function such as indexing, assigning URLs to speech menu items, and specifying the speech menu item itself. Alternatively, a more complex server-side program can be used wherein parameters can be passed to the server-side program specifying the function to be performed.

Figure 3:
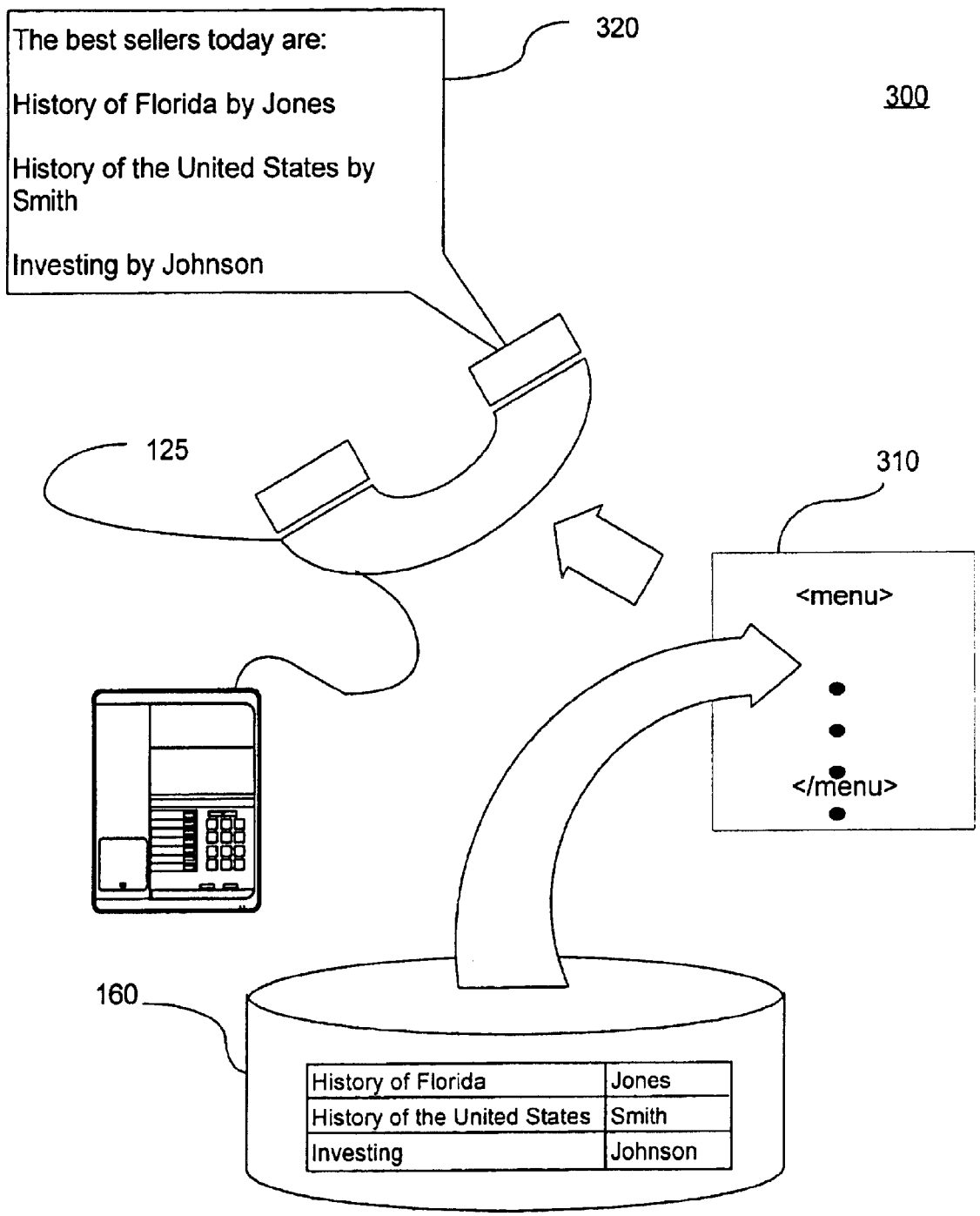
FIG. 3 is a pictorial representation of one aspect of the invention in which a VoiceXML formatted document is dynamically configured to include a speech menu of best selling books.

FIG. 3 is a pictorial representation 300 of one aspect of the invention in which a VoiceXML formatted document is dynamically configured to include a speech menu of best selling books. FIG. 3, as illustrated, includes the database 160, a dynamically formatted speech menu construct 310 as part of a voice-enabled markup language document, a telephone handset 125, and a speech menu 320. In operation, a user can communicate through the telephone handset 125 which can be operatively connected, for example, to an interactive voice response unit. Upon activation of the voice response system or responsive to a user request to hear a list of best-selling books, a server-side program can access the database 160 which can contain book selections and related book information. The server-side program can select the best-selling books from the database 160. Accordingly, the server-side program can include and properly format the selected database entries using a voice-enabled markup language within the speech menu construct 310. The resulting voice-enabled markup language document 310 can be interpreted by a voice-enabled application program, such as a voice-enabled browser, to generate the speech menu 320 shown in FIG. 3, which can be played to the user via the interactive voice response unit.

The appendix contains an exemplary listing of pseudo-code to illustrating portions of the invention disclosed herein.

APPENDIX

```
<menu>
    <prompt><enumerate/></prompt>
        <REPEAT INDEX="i">
            <%vXMLBestSellerServletBean.getDB2ADMIN_BOOKINFO_BSELLERNUM(i);%>
            <choice next="/servlet/VXMLMoreInfoServlet?selectedbook=<INSERT BEAN="vXMLBestSellerServletBean"
                PROPERTY="DB2ADMIN_BOOKINFO_TITLE"></INSERT>">
        <INSERT BEAN="vXMLBestSellerServietBean" PROPERTY="DB2ADMIN_BOOKINFO_TITLE"></INSERT>
            by
        <INSERT BEAN="vXMLBestSellerServletBean" PROPERTY="DB2ADMIN_BOOKINFO_AUTHOR"></INSERT>
        </choiece>
    </REPEAT>
</menu>
``` what is claimed is:

1. A method of dynamically formatting a speech menu construct comprising:

providing a markup language document containing a reference to a server-side program, said server-side program programmed to dynamically format data using a voice-enabled markup language;

accessing a database using said server-side program, said database having a plurality of data items;

selecting particular ones of said plurality of data items; and formatting said selected data items using said voice-enabled markup language thereby creating speech menu items specifying a speech menu construct, wherein said selected data items from said database are used as said speech menu items.

2. The method of claim 1, further comprising:

generating a speech grammar using said selected particular ones of said plurality of data items, wherein said speech grammar can be used to voice-process menu choices corresponding to said speech menu items in said speech menu construct.

3. The method of claim 1, wherein said generated markup language specifying said speech menu is voice extensible markup language.

4. A system for generating a speech menu construct comprising:

a voice-enabled markup language document;

a server-side program accessible by a reference to said server-side program contained within said voice-enabled markup language document, wherein said server-side program is programmed to access a database of data items and format selected data items for inclusion within said speech menu construct using a voice-enabled markup language, wherein said selected data items from said database are used as said speech menu items.

5. A VoiceXML formatted machine readable storage, having stored thereon a computer program having a plurality of code sections executable by a machine for causing the machine to perform the steps of:

providing a markup language document containing a reference to a server-side program, said server-side program programmed to dynamically format data using VoiceXML;

accessing a database using said server-side program, said database having a plurality of data items;

selecting particular ones of said plurality of data items; and formatting said selected data items using said voice-enabled markup language thereby creating speech menu items specifying a speech menu construct, wherein said selected data items from said database are used as said speech menus items.

6. A machine readable storage, having stored thereon a computer program having a plurality of code sections executable by a machine for causing the machine to perform the steps of:

providing a markup language document containing a reference to a server-side program, said server-side program programmed to dynamically format data using a voice-enabled markup language;

accessing a database using said server-side program, said database having a plurality of data items;

selecting particular ones of said plurality of data items; and formatting said selected data items using said voice-enabled markup language thereby creating speech menu items specifying a speech menu construct, wherein said selected data items from said database are used as said speech menu items.

7. The machine readable storage of claim 6, further comprising:

generating a speech grammar using said selected particular ones of said plurality of data items, wherein said speech grammar can be used to voice-process menu choices corresponding to said speech menu items in said speech menu construct.

8. The machine readable storage of claim 6, wherein said generated markup language specifying said speech menu is voice extensible markup language.

* * * * *